United States Patent [19]

Fenton

[11] Patent Number: 4,544,397

[45] Date of Patent: Oct. 1, 1985

[54] FEEDER MECHANISM FOR SUPPLYING GOBS OF PLASTIC MATERIAL

[75] Inventor: Frank A. Fenton, Wheatley, England

[73] Assignee: Emhart Industries, Inc., Farmington, Conn.

[21] Appl. No.: 510,866

[22] Filed: Jul. 5, 1983

[30] Foreign Application Priority Data

Jul. 9, 1982 [GB] United Kingdom ............... 829985

[51] Int. Cl.⁴ .............................................. C03D 11/00
[52] U.S. Cl. ........................................ 65/332; 65/334; 83/602; 83/699; 83/700
[58] Field of Search ................... 65/332, 334; 83/602, 83/699, 700

[56] References Cited

U.S. PATENT DOCUMENTS 1,304,568  5/1919  Jensen et al. ................. 65/334 X
2,956,371 10/1960  Torok ............................. 65/334 X
3,996,037 12/1976  Wythe ............................ 65/334
4,388,100  6/1983  Marroquin ..................... 65/334

FOREIGN PATENT DOCUMENTS 641944  5/1962  Canada .............................. 65/334

Primary Examiner—Robert Lindsay
Attorney, Agent, or Firm—Arthur B. Moore

[57] ABSTRACT

The feeder mechanism comprises apparatus for shearing gobs from plastic material e.g. glass comprising a set of shear blades movable between open and shearing positions thereof. A driving system for the shear blades comprises a cam having a cam track and a servo-motor arranged to drive the cam at a speed which is varied in accordance with control signals derived from a stored program to move the shear blades in accordance with a desired position against time curve between limits defined by the shape of the cam track.

11 Claims, 2 Drawing Figures

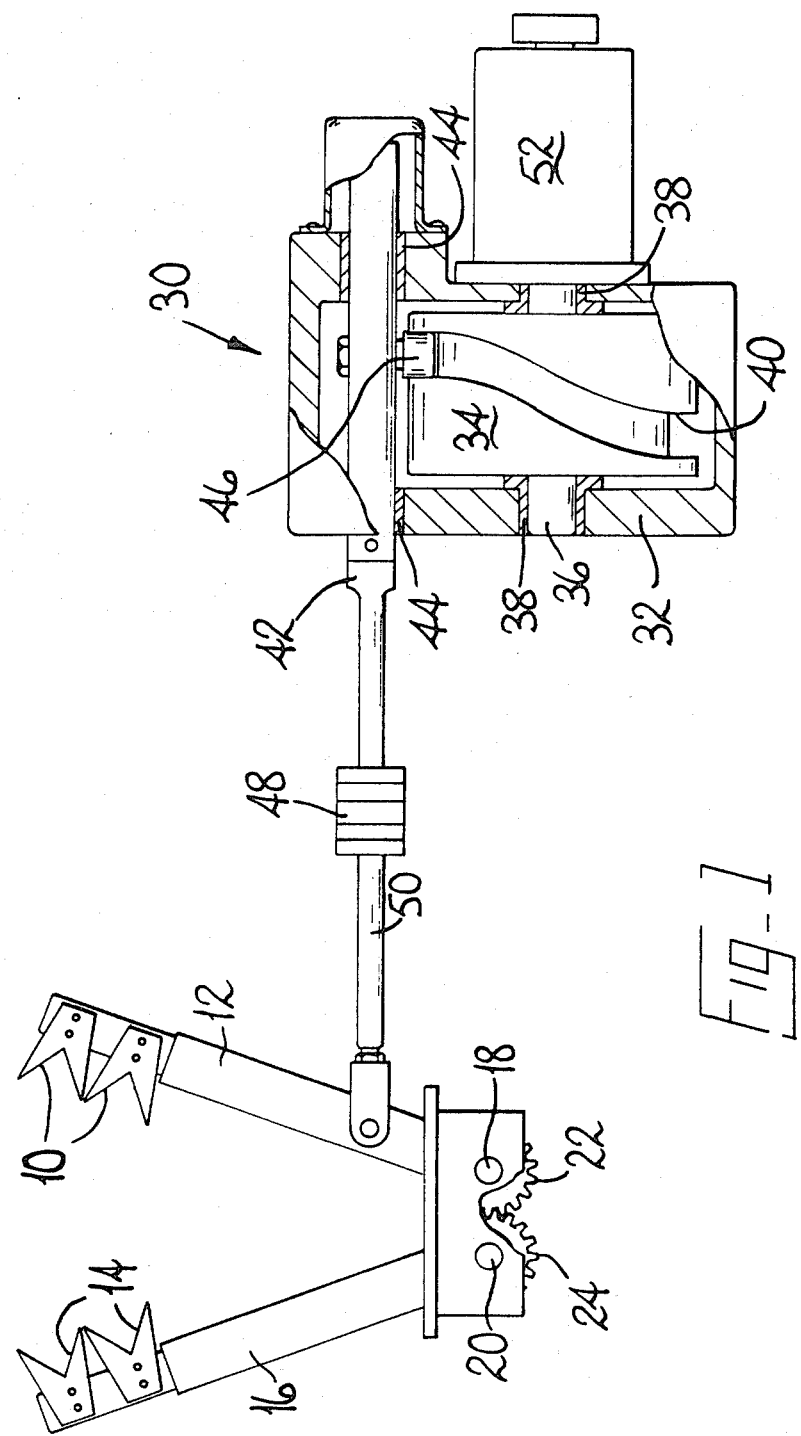
Fig_1

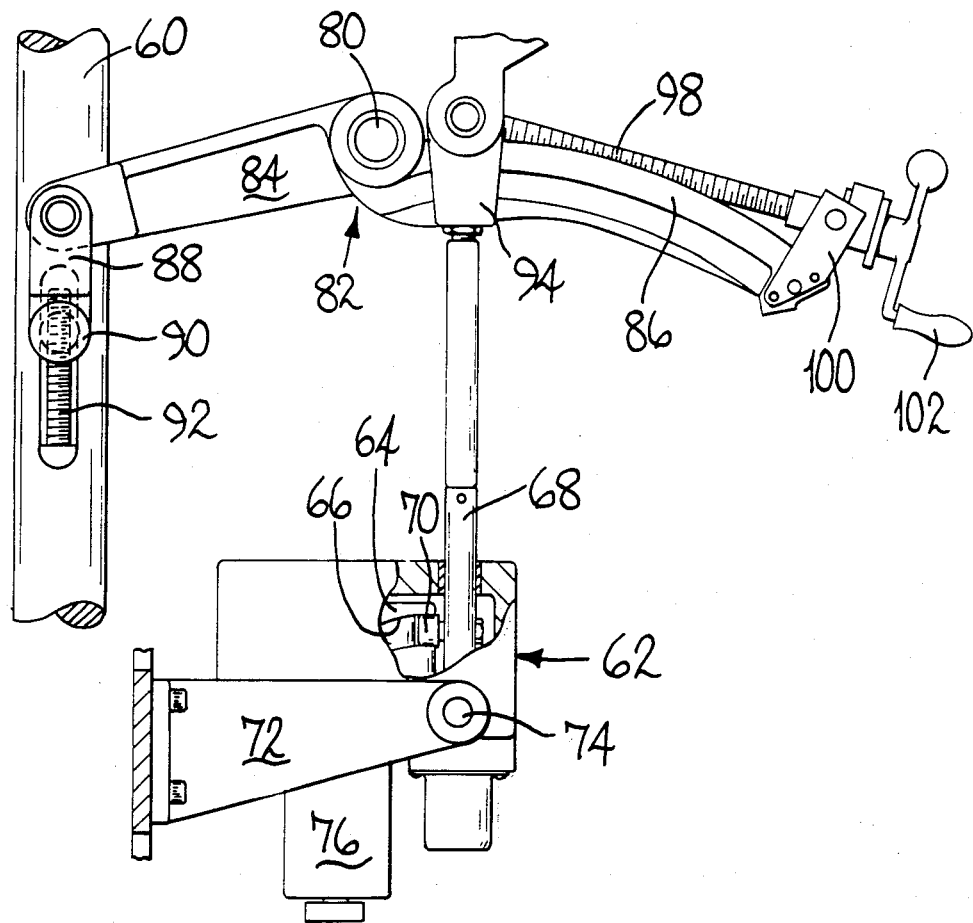
Fig_2

FEEDER MECHANISM FOR SUPPLYING GOBS OF PLASTIC MATERIAL

BACKGROUND OF THE INVENTION

This invention is concerned with a feeder mechanism for supplying gobs of plastic material e.g. molten glass, the mechanism comprising a plunger driving means operable to move a plunger into and out of an opening in the bottom of a channel containing plastic material so that, when the plunger is out of the opening, the plastic material flows out through the opening, and apparatus for shearing gobs from the material flowing out through the opening, the apparatus comprising a set of shear blades movable towards and away from one another between open and shearing positions thereof, and a driving system arranged to drive the shear blades.

In the operation of a glass container forming machine, a feeder mechanism as described above supplies gobs of molten glass which are moulded into containers by the machine. It is necessary that the shear blades of the mechanism perform a precise stroke between an overlapping shearing position and an open position thereof. The length of the stroke is constant for all working conditions of the feeder mechanism but it is necessary to vary the speed and relative timings of different portions of the stroke, when changing from gobs of one size to gobs of another size or when changing the shape of the gob, since there is a different desired position against time curve for the blades for each size and shape of gob.

In order to achieve the desired position against time curve for a particular gob, present feeder mechanisms each comprise a driving system for the shear blades which comprises a plate cam having an edge profile in accordance with the desired position against time curve for the blades, a cam follower running on the edge of the cam being mechanically connected to the blades. The cam is rotated continuously in the operation of the machine at a constant speed so that successive strokes of the shear blades are made with the position against time curve of the shear blades being determined entirely by the shape of the cam. When a gob of a different size or shape is to be produced, the cam is removed and replaced by another having a different profile. It is usually necessary to maintain a supply of alternative cams. Furthermore, it is not possible to vary the position against time curve without producing a new cam and stopping the machine to fit it.

It is an object of the present invention to provide a feeder mechanism in which the position against time curve of the shear blades can be varied without requiring a new cam and without requiring the machine to be stopped.

BRIEF SUMMARY OF THE INVENTION

The invention provides a feeder mechanism for supplying gobs of plastic material, e.g. molten glass, the mechanism comprising a plunger driving means operable to move a plunger into and out of an opening in the bottom of a channel containing the plastic material so that, when the plunger is out of the opening, the plastic material flows out through the opening, and apparatus for shearing gobs from the material flowing out through the opening, the apparatus comprising a set of shear blades movable towards and away from one another between open and shearing positions thereof, and a driving system arranged to drive the shear blades, the driving system for the shear blades comprising a link connected to the shear blades and mounted for linear movement to move the shear blades as aforesaid, a cam mounted for rotation about a central axis thereof, the cam having a cam track, a cam follower mounted on the link and engaging the cam track so that rotation of the cam about its axis causes linear movement of the link, wherein the cam is arranged to be driven about its axis by a servo-motor at a speed which is varied in accordance with control signals derived from a stored program to thereby move the shear blades in accordance with a desired position against time curve between limits defined by the shape of the cam track.

In a feeder mechanism according to the invention, the driving system for the shear blades does not involve any cams which require replacement and thus avoids the necessity to maintain a supply of cams. If it is desired to vary the position against time curve of the shear blades, the stored program can be altered to affect this change. Indeed, it is possible to affect this change without stopping the machine. The use of the cam track to define the limits of the movement ensures that the open and shearing positions of the blades are precisely defined. Furthermore, the use of simpler cams is possible since the cam track can have a simple shape.

In present feeder mechanisms, the cam follower is held against the edge of the cam by a spring, in some circumstances this may result in the follower briefly leaving the edge with the result that the position of the shear blades varies from that desired in an uncontrolled manner. This problem is overcome if the cam track is in the form of a continuous groove which closely fits the cam follower.

The programming of the mechanism can be simplified if the cam track is in the shape of a sine wave.

In present feeder mechanisms, the plunger driving means is similar to the driving system for the shear blades in that it comprises a continuously driven plate cam having an edge profile in accordance with the desired position against time curve for the plunger. Accordingly, as the plunger movements require to be altered for different gobs, it is necessary to maintain a supply of alternative cams. Such cams also incorporate different extreme positions for the plunger since different strokes of the plunger may be of different length. In order to avoid the necessity for maintaining a supply of cams for the plunger driving means and also because it is generally convenient to operate the driving system of the shear blades and the plunger driving means on a similar principle, according to a further arrangement of the invention the plunger driving means comprises a stroke device which determines the extreme positions reached by the plunger, the stroke device having an adjustable stroke, and a driving system for the stroke device, the driving system for the stroke device comprising a link connected to the stroke device and mounted for linear movement to cause the stroke device to move the plunger, a cam mounted for rotation about a central axis thereof, the cam having a cam track, a cam follower mounted on the link and engaging the cam track so that rotation of the cam track about its axis causes linear movement of the link, wherein the cam is arranged to be driven about its axis by a servo-motor at a speed which is varied in accordance with control signals derived from a stored programme to thereby move the plunger in accordance with a desired position against time curve between limits defined by the shape of the cam track.

BREIF DESCRIPTION OF THE DRAWINGS

A feeder mechanism which is illustrative of the invention is shown in the drawings in which:

FIG. 1 is a diagrammatic view of shear blades and associated parts of the illustrative feeder mechanism;

FIG. 2 is a diagrammatic view of plunger moving means of the illustrative feeder mechanism; and FIG. 3 is a block schematic diagram of control means for the shear blades of FIG. 1.

DETAILED DESCRIPTION

The Figures show portions of a feeder mechanism in accordance with the invention. The feeder mechanism is for supplying gobs of molten glass. The mechanism comprises a plunger driving means shown in FIG. 2 which is operable to move a plunger (not shown) into and out of an opening in the bottom of a channel (not shown). The channel contains molten glass and, in conventional manner, when the plunger is out of the opening, the molten glass flows out through the opening. The mechanism also comprises apparatus shown in FIG. 1 for shearing gobs from the molten glass flowing out through the opening.

The shearing apparatus shown in FIG. 1 comprises a set of shear blades comprising two blades 10 mounted on an arm 12 and two co-operating blades 14 mounted on an arm 16. The set of shear blades is arranged to shear two gobs simultaneously with each blade 10 co-operating with one of the blades 14 to shear through the molten glass. The arms 12 and 16 are mounted for pivoting movement about pivot pins 18 and 20 respectively to move the blades 10 and 14 along arcuate paths towards and away from one another between open (shown in FIG. 1) and shearing positions thereof. The arm 12 has a portion 22 thereof which is arcuate about the pin 18 formed with teeth which mesh with similar teeth formed on a portion 24 of the arm 16 which is arcuate about the pin 20. Through the meshing of the teeth on the portions 22 and 24, it is ensured that, when the arm 12 moves pivotally about the pin 18, the arm 16 makes an equal pivotal movement about the pin 20 but in the opposite direction.

The shearing apparatus also comprises a driving system 30 arranged to drive the shear blades 10 and 14 by moving the arm 12 pivotally about the pin 18. The driving system comprises a box 32 within which a cylindrical cam 34 is mounted. The cam 34 is fixedly mounted on a shaft 36 which is rotatable in bearings 38 supported by the box 32 so that the cam 34 can be rotated about its central axis. A cam track 40 is formed in the outer curved surface of the cam 34. The cam track 40 is in the shape of a sine wave and is in the form of a continuous groove around the cam 34. The system 30 also comprises a link 42 which is slidable longitudinally thereof and parallel to the longitudinal axis of the cam 34 on bearings 44 supported by the box 32. A cam follower in the form of a roller 46 is mounted on the link 42 so that the roller 46 can rotate about an axis which extends transversely of the link 42 and radially of the cam 34. The roller 46 is received in the cam track 40 in which it fits closely so that rotation of the cam 34 causes the link 42 to slide on the bearings 44 between limits defined by the shape of the cam track 40. The link 42 is connected, via, an overload and overlap adjuster 48, to a further link 50 which is pivotally connected to the arm 12. The overload and overlap adjuster 48 allows an initial adjustment of the distance between the link 42 and the link 50 to fix the amount of overlap of the blades 10 and 14 in the shearing position thereof and the adjuster 48 also contains a strong spring which allows the distance between the link 42 and the link 50 to reduce if the blades 10 and 14 become jammed but, in normal operation, the distance between the link 42 and the link 50 is fixed. The arrangement is thus such that, as the cam 34 is rotated, the link 42 caused to slide and the blades 10 and 14 are moved between their open and shearing positions. The open and shearing positions of the blades 10 and 14 depend on the stroke made by the link 42 which in turn depends on the extremes of the cam track 40.

The driving system 30 also comprises a D.C. servo-motor 52 which is arranged to drive the cam 34 about its axis. The motor 52 has the shaft 36 as its output shaft so that operation of the motor 52 is effective to rotate the cam 34. The driving system also comprises control means (not shown) arranged to generate electrical command signals to control the operation of the motor 52. These signals are derived from a stored program to cause the shear blades 10 and 12 to be moved in accordance with a desired position against time curve, due account being taken of the shape of the cam track 34 in determining the magnitude of the signal. With reference to the schematic diagram of FIG. 3, the control means 110 may comprise a memory 115 containing details of the desired position against time curve, a feedback device 112 driven from the motor 52, and a computer 120 arranged to continuously calculate the difference A-B between the desired position of the motor 52 at a given time, as obtained from the memory 115, and the actual position of the motor at that time, as recieved from the feedback device 112, and to provide an appropriate driving signal to the motor 52.

When it is desired to change the size or shape of the gob, the control signals are altered so that blades 10 and 14 move with a different position against time curve but the open and shearing positions of the blades 10 and 14 will remain unchanged as they are controlled by the shape of the cam track 40. It is thus possible to change the gob size without stopping the machine and no replacement of cams is necessary.

The plunger driving means shown in FIG. 2 is arranged to move a column 60 on which the plunger is mounted. The plunger driving means comprises a stroke device which determines the extreme positions reached by the plunger. The stroke device comprises a driving system 62 which is of similar construction to the driving system 30 having a cylindrical cam 64 with a cam track 66, a link 68 and a roller 70, the parts 64, 66, 68 and 70 being identical to the parts 34, 40, 42 and 46 respectively. The driving system 62 is mounted on a bracket 72 for pivoting movement about a pivot pin 74. The driving system 62 also comprises a D.C. servo-motor 76 which is identical to the motor 52.

Under the action of the motor 76, which is controlled by similar control means to the motor 52, the driving system 62 causes the link 68 to move through a stroke whose limits are defined by the shape of the cam track 66 and this stroke is transmitted to the column 60 by a lever arrangement of the stroke device.

The lever arrangement of the stroke device comprises a fixed pivot 80 on which a lever 82 is mounted for pivoting movement. The lever 82 comprises a first portion 84 which is to the left of the pivot 80 viewing FIG. 2 and a second portion 86 which is to the right of the pivot 80 viewing FIG. 2. The portion 84 of the lever 82 is pivotally connected to a link 88 which is in turn connected to the column 60 via a connection 90 which can be moved along the column 60 by means of an adjusting screw 92. The portion 86 of the lever 82 forms an arcuate slideway on which a block 94 to which the link 68 is connected is movable towards or away from the pivot 80. The block 94 can be moved along the slideway by means of an adjustment screw 98 which is supported by a bracket 100 carried by the portion 86. The screw 98 can be turned by means of a handle 102.

The arrangement is such that by turning the handle 102, the block 94 can be moved relative to the pivot 80 and the point at which the rod 68 acts on the lever 82 can be moved. Movement of the block 94 towards the pivot 80 increases the movement made by the column 60 during a stroke of the stroke device while movement of the block 94 away from the pivot 80 decreases this movement. When the block 94 is moved the driving system 62 pivots about the pin 74 to accommodate the movement.

It will be apparent that it is not necessary to change cams when using the illustrative feeder mechanism and the position against time curve of the shear blades can be changed without stopping the machine.

I claim:

1. An improved feeder mechanism for supplying gobs of plastic material, e.g. molten glass, of the type including a plunger driving means operable to move a plunger into and out of an opening in the bottom of a channel containing the plastic material so that, when the plunger is out of the opening, the plastic material flows out through the opening, and apparatus for shearing gobs from the material flowing out through the opening, the apparatus including a set of shears blades movable towards and away from one another between open and shearing positions thereof, and a driving system arranged to drive the shear blades, wherein the improvement comprises an improved driving system for the shear blades comprising a link connected to the shear blades and mounted for linear movement to move the shear blades as aforesaid, a cam mounted for rotation about a central axis thereof, the cam having a cam track, a cam follower mounted on the link and engaging the cam track so that rotation of the cam about its axis causes linear movement of the link, wherein the cam is arranged to be driven about its axis by a servomotor at a speed which is varied in accordance with control signals to move the shear blades in accordance with a desired position against time curve between limits defined by the shape of the cam track.

2. A feeder mechanism according to claim 1, wherein the cam track is in the form of a continuous groove which closely fits the cam follower.

3. A feeder mechanism according to claim 1, wherein the cam rack is in the shape of a sine wave.

4. A feeder mechanism according to claim 1, wherein the plunger driving means comprises a stroke device plunger, the stroke device having an adjustable stroke, and a driving system for the stroke device, the driving system for the stroke device comprising a link connected to the stroke device and mounted for linear movement to cause the stroke device to move the plunger, a cam mounted for rotation about a central axis thereof, the cam having a cam track, a cam follower mounted on the link and engaging the cam track so that rotation of the cam about its axis causes linear movement of the link, wherein the cam is rotated about its axis by a servo-motor at a speed which is varied in accordance with control signals to move the plunger in accordance with a desired position against time curve between limits defined by the shape of the cam track.

5. A feeder mechanism according to claim 4, wherein the cam track is in the form of a continuous groove which closely fits the cam follower.

6. A feeder mechanism according to claim 4, wherein the cam track is in the shape of a sine wave.

7. A feeder mechanism according to claim 1, wherein the control means comprises:
   servo-motor position means responsive to a feedback signal from said servo-motor for providing a signal indicative of servo-motor position;
   memory means for storing user-alterable data indicative of the desired position against time curve of the shear blades, and for outputting a shear blade position signal indicative of the desired position at any given time;
   means for deriving a difference signal based upon the shear blade position signal and servo-motor position signal; and
   means responsive to said difference signal for producing a compensating drive signal to control the speed of said servo-motor.

8. An improved feeder mechanism for supplying gobs of plastic material, e.g. molten glass, of the type including a plunger driving means operable to move a plunger into and out of an opening in the bottom of a channel containing the plastic material so that, when the plunger is out of the opening, the plastic material flows out through the opening, and apparatus for shearing gobs from the material flowing out through the opening, the apparatus including a set of shears blades movable towards and away from one another between open and shearing positions thereof, and a driving system arranged to reciprocate the shear blades, wherein the improvement comprises:
   an improved driving system for the shear blades comprising a link connected to the shear blades and mounted for linear movement to move the shear blades as aforesaid;
   a cam mounted for rotation about a central axis thereof, the cam having a cam track;
   a cam follower mounted on the link and engaging the cam track so that rotation of the cam about its axis causes linear movement of the link;
   a servo-motor for rotating the cam about its axis; and
   control means for said servo-motor, comprising:
      servo-motor position means responsive to a feedback signal from said servo-motor for providing a signal indicative of servo-motor position;
      memory means for storing user-alterable data indicative of the desired position against time curve of the shear blades, and for outputting a shear blade position signal indicative of the desired position at any given time;
      means for deriving a difference signal based upon the shear blade position signal and servo-motor position signal; and
      means responsive to said difference signal for producing a compensating drive signal to control the speed of said servomotor.

9. A feeder mechanism as defined in claim 1 wherein the control signals are derived from a stored program.

10. A feeder mechanism as defined in claim 7 where in the means for producing the compensating drive signal comprises a stored program.

11. A feeder mechanism as defined in claim 8 where in the means for producing the compensating drive signal comprises a stored program.

* * * * *